(12) United States Patent
Asare et al.

(10) Patent No.: US 7,080,279 B2
(45) Date of Patent: Jul. 18, 2006

(54) AUTONOMIC ROLLBACK

(75) Inventors: Kwasi Addo Asare, Durham, NC (US); Attila Barta, Toronto (CA); Richard D. Huddleston, Newtonville, MA (US); Daniel Everett Jemiolo, Pascoag, RI (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 10/727,011

(22) Filed: Dec. 3, 2003

(65) Prior Publication Data

US 2005/0138468 A1 Jun. 23, 2005

(51) Int. Cl.
*G06F 11/00* (2006.01)

(52) U.S. Cl. .......................... 714/13; 711/156
(58) Field of Classification Search ............... 711/156, 711/161, 162; 713/100, 187; 714/13, 15; 717/170, 177
See application file for complete search history.

(56) References Cited

U.S. PATENT DOCUMENTS

| | | | |
|---|---|---|---|
| 6,282,711 B1 | 8/2001 | Halpern et al. | |
| 6,442,754 B1 | 8/2002 | Curtis | |
| 6,820,259 B1 * | 11/2004 | Kawamata et al. | 717/173 |
| 2001/0025229 A1 | 9/2001 | Mortiz et al. | |
| 2003/0121033 A1 * | 6/2003 | Peev et al. | 717/175 |
| 2004/0088601 A1 * | 5/2004 | Shah et al. | 714/15 |
| 2004/0153724 A1 * | 8/2004 | Nicholson et al. | 714/6 |
| 2005/0034122 A1 * | 2/2005 | Kung et al. | 717/177 |

FOREIGN PATENT DOCUMENTS

EP 1 083 483 A1 3/2001

OTHER PUBLICATIONS

Anonymous Author, *Reduce Disk Space Requirements During Installation, Microsoft Office 2000 Resource Kit Journal*, 1999, pp. 1-2, Microsoft Corporation.
Lowe, S., *Roll Back Servers Using Winternals Recovery Manager*, 2003, pp. 1-2, TechRepublic.
Anonymous Author, *Recover Systems Remotely Throughout Your Enterprise, Winternals Recovery Manager*, 2003, 2 pp., Winternals Software LP.

* cited by examiner

*Primary Examiner*—Hiep T. Nguyen
(74) *Attorney, Agent, or Firm*—A. Bruce Clay, Esq.; Steven M. Greenberg, Esq.; Christopher & Weisberg, P.A.

(57) ABSTRACT

An autonomic rollback system. An autonomic rollback system can include a registry configured to store meta-data specifying a contemporary state of a system of components. The system also can include a backup location configured to store a backup copy of the meta-data in the registry specifying a past state of the system of components prior to installing a new component. A monitor can be programmed to compare the operation of the system of components with a policy defining a nominal state of operation for the system of components. Finally, a rollback processor can be coupled to the registry and the backup location. Responsive to the monitor, the rollback processor can restore the registry to the past state when the monitor determines that the operation of the system of components falls outside the nominal state defined within the policy. Importantly, the system of components can reside within an application server.

15 Claims, 2 Drawing Sheets

AUTONOMIC ROLLBACK

BACKGROUND OF THE INVENTION

1. Statement of the Technical Field

The present invention relates to the field of software installation and more particularly to software un-installation.

2. Description of the Related Art

The installation of software has long proven to be challenging even to the most sophisticated of end users. Prior to the advent of the multiprocessing and multitasking operating system, software installation in the personal computing context often merely required the transfer of program files from portable media such as a floppy diskette to fixed storage. On occasion, where the program to be installed exceeded in size that which could be hosted in a single floppy diskette, the installation process could span the multiple diskettes ultimately resulting in the assembly of all required program files in a strategic location on disk.

When graphical windowing operating systems stormed the marketplace in the early 1990s, no longer did the copying of program files suffice in the installation of a computer program. Rather, complex configuration of the application, the windowing operating system, or both could be required depending upon the level of integration required for the effective, trouble-free operation of the application in within the graphical environment. Initially, the complex configuration could be specified in a separate text file such as an initialization file. Subsequently, as the windowing environment itself transformed into an ultra-complex system, registry entries would become the de facto medium for persisting configuration elements of an application. In both cases, however, sophisticated installation programs became the norm in deploying new software applications.

Significantly, given the complexity of the modern software installation process, a great many number of opportunities exist for the installation to fail. Accounting for this possibility, many conventional software installation applications permit a counter-installation process known in the art as an un-installation process. In the prototypical un-installation process, all files transferred to fixed storage can be removed, e.g. deleted, and all entries applied to the registry can be purged from the registry. The un-installation process can become complicated, however, where registry entries are not added, but changed, and where all files added may already support the operation of other installed applications. Of course, it is to be recognized by the skilled artisan that registry entries in of themselves are limited to files and application settings and do not relate the deployment of application objects or components. Moreover, registry entries mostly relate to a single computing platform and cannot be scaled to the enterprise.

In any case, oftentimes shared files cannot be removed during an un-installation process lest their removal affect the operation of other already installed applications. Similarly, those registry entries which have been modified merely cannot be removed lest their removal similarly affect the operation of an application dependant upon the existence the registry entry. Rather, to place the system in a state which existed prior to the installation of the application, the registry entries must be "rolled-back" and only those files which had been added to the system and which are not relied upon by other applications in the system must be removed.

Presently, rollback technologies exist typically as part of installation processes and as part of the underlying operating system. For instance, in one popular office productivity suite, every file and registry removed by the installation process can be saved to a hidden folder. When the installation process has completed successfully, the hidden folder and all of its contents can be deleted. When the installation process is cancelled or fails before the process can complete, the installation process can refer the hidden folder to rollback the registry to its former state and to replace any files which had been removed up to the point of failure.

Despite the advancement of installation technologies, rollback methodologies alone do not completely address the matter of a failed software installation. Specifically, though an application can be completely installed without incident, the subsequent operation of the installed application either can fail to effectively coexist with other installed applications, or can fail in its own operation. In either case, it would be preferable to completely remove the newly installed application as if the installed application had never been. Unfortunately, conventional rollback technologies cannot accommodate the foregoing circumstance because rollback technologies remain effectively only during the course of the installation process.

Personal computing systems recently have been distributed with blanket rollback technologies in which the entire image of the system can be replaced with a previous image which existed before the occurrence of a failed installation. Nevertheless, the blanket rollback approach can be described as heavy handed in as much as it is not desirable to rollback the state of the system so that desirable state changes in the system are rolled back along with the effect of the failed installation. Moreover, the blanket rollback technology requires a manual determination that an installation has failed.

Yet, in the computing environment of the twenty-first century, determining that an installation failure has occurred often is a matter of subjective determination which is not easily resolved through the manual intervention of a human being. Accordingly, it would be desirable to implement the effect of rollback technologies in a manner so as to permit the rolling back of a failed installation when it can be determined that an application installation has failed though the installation process itself may have completed successfully. Moreover, it would be desirable to extend the effect of rollback technologies to the deployment of application objects and components, both within a single computing platform and in a scaled manner in the computing enterprise.

SUMMARY OF THE INVENTION

The present invention addresses the deficiencies of the art in respect to software un-installation and provides a novel and non-obvious method, system and apparatus for autonomically rolling back the state of a system when an installation process has completed successfully, but where the operation of the system as modified is considered a failure. In a preferred aspect of the present invention, an autonomic rollback system can include a registry configured to store meta-data specifying a contemporary state of a system of components. The system also can include a backup location configured to store a backup copy of the meta-data in the registry specifying a past state of the system of components prior to installing a new component.

A monitor can be programmed to compare the operation of the system of components with a policy defining a nominal state of operation for the system of components. Finally, a rollback processor can be coupled to the registry and the backup location. Responsive to the monitor, the rollback processor can restore the registry to the past state when the monitor determines that the operation of the system of components falls outside the nominal state defined within the policy. Importantly, the system of components can reside within an application server.

A method for autonomically rolling back a system of components in response to detecting a failure condition in the system can include, prior to installing a new component in the system, recording a backup copy of a registry storing contemporary system state information. The new component can be installed in the system and a new state of the system can be recorded in the registry. The operation of the system can be monitored and the operation of the system can be compared to a policy defining a nominal state of operation for the system. When the operation of the system exceeds the defined nominal state of operation in the policy, the installed new component can be removed and the registry can be restored with the backup copy in order to rollback the new state to a state which had existed prior to the installation of the new component.

Notably, the step of recording a backup copy of a registry can include recording a listing of all installed components in the system, defining dependencies between the installed components, specifying resources within the system which are required by at least one of the installed components, and identifying environmental parameter values established to support the installed components. Similarly, the step of recording a new state in the registry can include recording a listing of all installed components in the system including the new component, defining dependencies between the installed components, specifying resources within the system which are required by at least one of the installed components, and identifying environmental parameter values established to support the installed components.

In response to the detection of a failure condition, resources which are no longer required by any of the installed components as can be inferred from the restored registry can be released. Moreover, the environmental parameters can be reset to values specified within the restored registry. Finally, a network administrator can be notified when the operation of the system exceeds the defined nominal state of operation in the policy so that the network administrator can manually determine when a rollback process is appropriate.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is an autonomic rollback system. In accordance with the present invention, a registry can store therein meta-data regarding the state of a system which can change as new applications are installed. When an application is installed, the meta-data within the registry can be copied to a backup location as can any externally referenced data. Subsequently, even though the installation process of a particular application may have completed successfully, the operation of the installed application, or the operation of other installed applications, may fail requiring the un-installation of the application and the rolling back of the state of the system In this regard, a policy can be established which can specify operational boundaries within which the operation of the system can be considered nominal, and beyond which the system can be determined to have failed. Importantly, the installation of an application can be determined to have failed despite the successful completion of a corresponding installation routine. In any case, the operation of the system can be monitored and compared to the policy to identify a failure condition.

Where the bounds of the policy have been exceeded by the operation of the system, a systems administrator can be notified. Moreover, preferably the most recently installed application can be un-installed and the state of the system can be rolled back to a state which had existed prior to the installation of the application. In this regard, the registry copy and the external data in the backup location can be consulted to restore the system to the prior state. Additionally, the meta-data in the registry copy in the backup location can replace the most recent meta-data in the registry.

Figure 1:
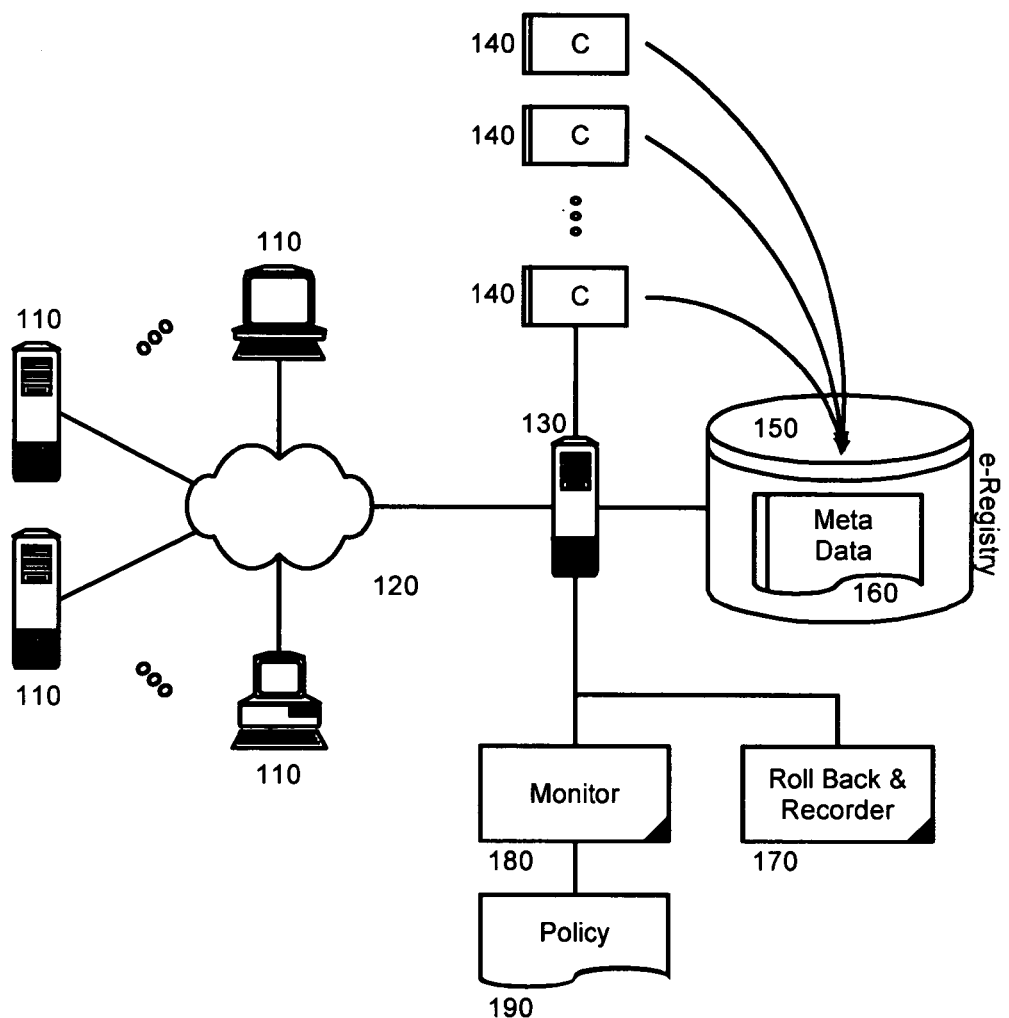
FIG. 1 is schematic illustration of an autonomic rollback system which has been configured in accordance with a preferred aspect of the inventive arrangements; and, FIG. 2 is a flow chart illustrating a process for detecting and rolling back a system following the failed installation of a component in the system of FIG. 1.

Importantly, the autonomic rollback system of the present can be applied to the context of installing new components in a component-based system hosted within an application server. In further illustration, FIG. 1 is schematic illustration of an autonomic rollback system configured accordingly. As shown in FIG. 1, the autonomic rollback system can include one or more client computing devices 110 coupled to an application server 130 over a computer communications network 120. The application server 130 can host a number of components 140 operating in concert with one another to form an application.

An e-Registry 150 can be further coupled to the application server 130. The e-Registry 150 can store therein meta-data 160 regarding the state of the application as defined by the installed components 140. Specifically, the meta-data 160 can include both a contemporary snapshot of the state of the system of components 140, as well as a backup copy of a snapshot of the state of the system of components 140 at a time prior to the installation of the most recent one of the components 140. Moreover, the backup copy can include external data referenced within the meta-data 160.

A roll back and recorder process 170 also can be coupled to the application server 130. The roll back and recorder process 170 both can maintain the meta data 160 in the e-Registry 150, and also can manage the rolling back of the state of the system of components 140 when deemed appropriate by the monitor 180. In this regard, the monitor 180 can be coupled both to the application server 130 and a policy 190 and can monitor the operation of the system of components 140. The policy 190, by comparison, can specify operational boundaries within which the operation of the system of components 140 can be considered nominal, and beyond which the operation of the system of components 140 can be considered anomalous.

When a new one of the components 140 is installed, the roll back and recorder process 170 can create a copy of the meta data 160 in the e-Registry 150 to reflect the state of the system of components 140 at the time of the installation. Additionally, external data referenced by elements of the meta data 160 further can be stored with the copy. Subsequently, the new one of the components 140 can be installed and the configuration of the system of components 140 can be written to the e-Registry 150. Once the installation process has completed, the system can be loaded for execution and the monitor 180 can begin the process of monitoring the operation of the system of components 140.

When the monitor 180 determines that the operation of the system of components 140 exceeds the boundaries set forth in the policy 190, a failure condition can be declared and a suitable role can be notified, for instance the network administrator. Additionally, in a preferred aspect of the present invention, the roll back and recorder process 170 can retrieve an archive copy of the meta data 160 in the e-Registry 150 in order to restore the state of the system of components 140 as it had been prior to the installation of the most recent one of the components 140. In this way, the state of the system can be rolled back to its prior state, even though the installation process of the newly installed one of the components 140 may have completed successfully some time beforehand.

Figure 2:
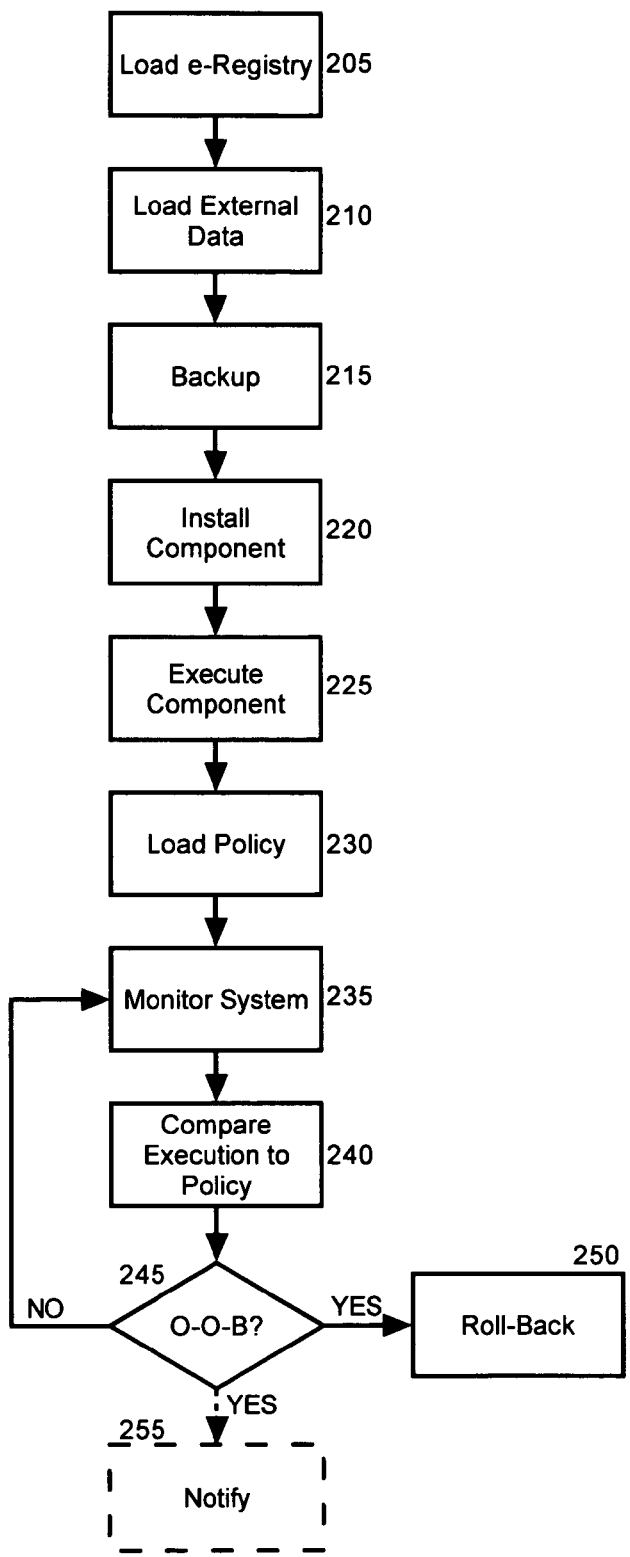

In more particular illustration, FIG. 2 is a flow chart illustrating a process for detecting and rolling back a system following the failed installation of a component in the system of FIG. 1. Beginning in block 205, when a request to install a new component is received, the e-Registry can be loaded as can any external data reference by thee-Registry in block 210. In block 215, the contents of thee-Registry and the external data can be backed up to another location, for instance a backup location within the e-Registry. In block 220, the component can be installed to the system using conventional installation means.

In block 225, once the installation process has completed, the system can be reloaded for operation. Additionally, in block 230 a policy can be loaded for determining when the operation of the system has failed. In block 235, the operation of the system can be monitored and in block 240, measurable aspects of the operation can be compared to parameters specified within the policy in decision block 245, it can be determined whether the operation of the system has caused an out-of-bounds condition. If not, the monitor can continue to monitor the operation of the system through blocks 235, 240 and 245.

In the event that the monitor detects an out-of-bounds condition in decision block 245, however, in block 255 a suitable role can be notified of the out-of-bounds condition. In this regard, a notification can be sent to the role specifying the particular parameters which had been exceeded in the policy. Based upon the notification, the role can direct the un-installation of the component and the rolling back of the system to a state reflected in the backup copy of the e-Registry. Preferably, the foregoing process can be managed autonomically in block 250 by directing the rolling back of the system without first requiring human intervention.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. An autonomic rollback system comprising:
   a registry configured to store meta-data specifying a contemporary state of a system of components;
   a backup location configured to store a backup copy of the meta-data in said registry specifying a past state of said system of components prior to installing a new component;
   a monitor programmed to compare the operation of said system of components with a policy defining a nominal state of operation for said system of components; and,
   a rollback processor coupled to said registry and said backup location and responsive to said monitor, said rollback processor having programming for restoring said registry to said past state when said monitor determines that the operation of said system of components falls outside said nominal state defined within said policy.

2. The autonomic rollback system of claim 1, wherein said system of components resides within an application server.

3. A method for autonomically rolling back a system of components in response to detecting a failure condition in the system, the method comprising the steps of:
   prior to installing a new component in the system, recording a backup copy of a registry storing contemporary system state information;
   installing said new component in the system and recording a new state of the system in said registry;
   monitoring the operation of the system and comparing said operation to a policy defining a nominal state of operation for the system; and,
   when the operation of the system exceeds said defined nominal state of operation in said policy, removing said installed new component and restoring said registry with said backup copy in order to rollback said new state to a state which had existed prior to said installation of said new component.

4. The method of claim 3, wherein said step of recording a backup copy of a registry comprises the steps of:

recording a listing of all installed components in the system;

defining dependencies between said installed components;

specifying resources within the system which are required by at least one of said installed components; and, identifying environmental parameter values established to support said installed components.

5. The method of claim 4, wherein said step of recording a new state in said registry comprises the steps of:

recording a listing of all installed components in the system including said new component;

defining dependencies between said installed components;

specifying resources within the system which are required by at least one of said installed components; and, identifying environmental parameter values established to support said installed components.

6. The method of claim 5, further comprising the steps of:

releasing resources no longer required by any of said installed components; and, resetting said environmental parameters to values specified within said restored registry.

7. The method of claim 3, further comprising the step of notifying a network administrator when the operation of the system exceeds said defined nominal state of operation in said policy.

8. A machine readable storage having stored thereon a computer program for autonomically rolling back a system of components in response to detecting a failure condition in the system, the computer program comprising a routine set of instructions for causing the machine to perform the steps of:

prior to installing a new component in the system, recording a backup copy of a registry storing contemporary system state information;

installing said new component in the system and recording a new state of the system in said registry;

monitoring the operation of the system and comparing said operation to a policy defining a nominal state of operation for the system; and, when the operation of the system exceeds said defined nominal state of operation in said policy, removing said installed new component and restoring said registry with said backup copy in order to rollback said new state to a state which had existed prior to said installation of said new component.

9. The machine readable storage of claim 8, wherein said step of recording a backup copy of a registry comprises the steps of:

recording a listing of all installed components in the system;

defining dependencies between said installed components;

specifying resources within the system which are required by at least one of said installed components; and, identifying environmental parameter values established to support said installed components.

10. The machine readable storage of claim 9, wherein said step of recording a new state in said registry comprises the steps of:

recording a listing of all installed components in the system including said new component;

defining dependencies between said installed components;

specifying resources within the system which are required by at least one of said installed components; and, identifying environmental parameter values established to support said installed components.

11. The machine readable storage of claim 10, further comprising the steps of:

releasing resources no longer required by any of said installed components; and, resetting said environmental parameters to values specified within said restored registry.

12. The machine readable storage of claim 8, further comprising the step of notifying a network administrator when the operation of the system exceeds said defined nominal state of operation in said policy.

13. An e-Registry configured to store meta-data specifying a contemporary state of a system of components and coupled to a backup location for storing a backup copy of said meta-data specifying a past state of said system of components prior to installing a new component, said e-Registry further comprising a communicative coupling to a monitor programmed to compare the operation of said system of components with a policy defining a nominal state of operation for said system of components, said e-Registry yet further comprising a communicative coupling to a rollback processor having programming for restoring said e-Registry to said past state when said monitor determines that the operation of said system of components falls outside said nominal state defined within said policy.

14. The e-Registry of claim 13, wherein said e-Registry is disposed within an application server.

15. The e-Registry of claim 13, wherein said e-Registry is disposed externally to a cluster of application servers, and wherein said system of components comprises a set of components deployed about a cluster of application servers.

* * * * *